J. MACÉ.
APPARATUS FOR SOLVING PROBLEMS OF SPHERICAL GEOMETRY.
APPLICATION FILED MAY 7, 1913.
1,223,502.
Patented Apr. 24, 1917.
2 SHEETS—SHEET 1.
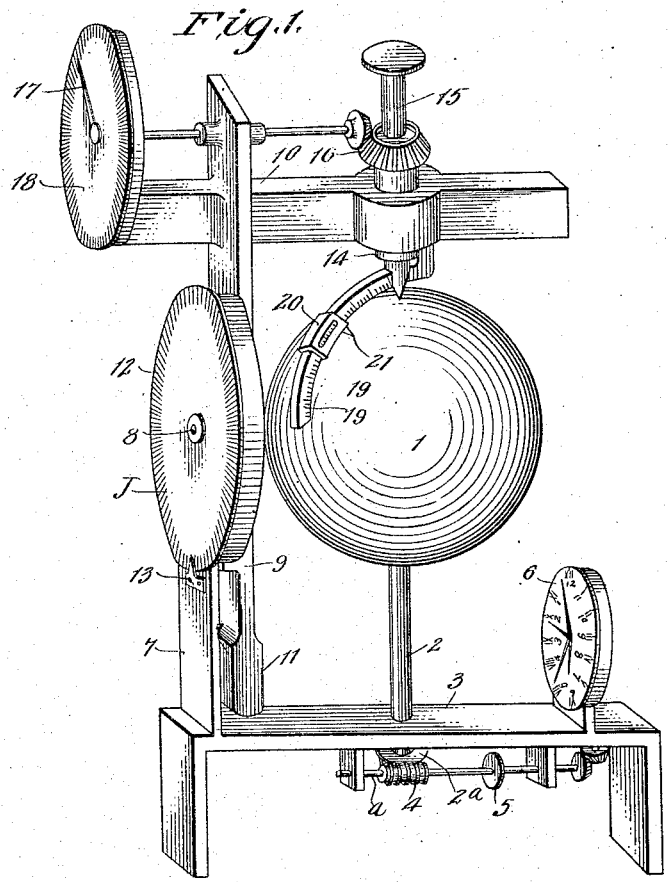
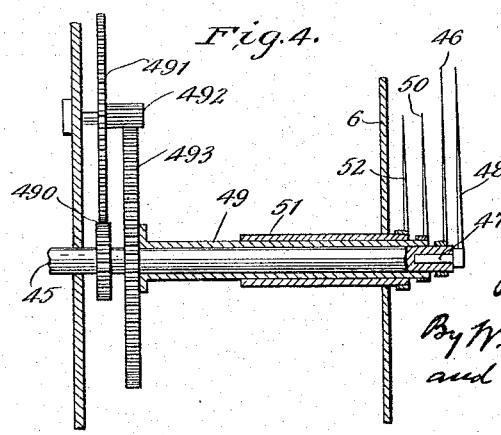

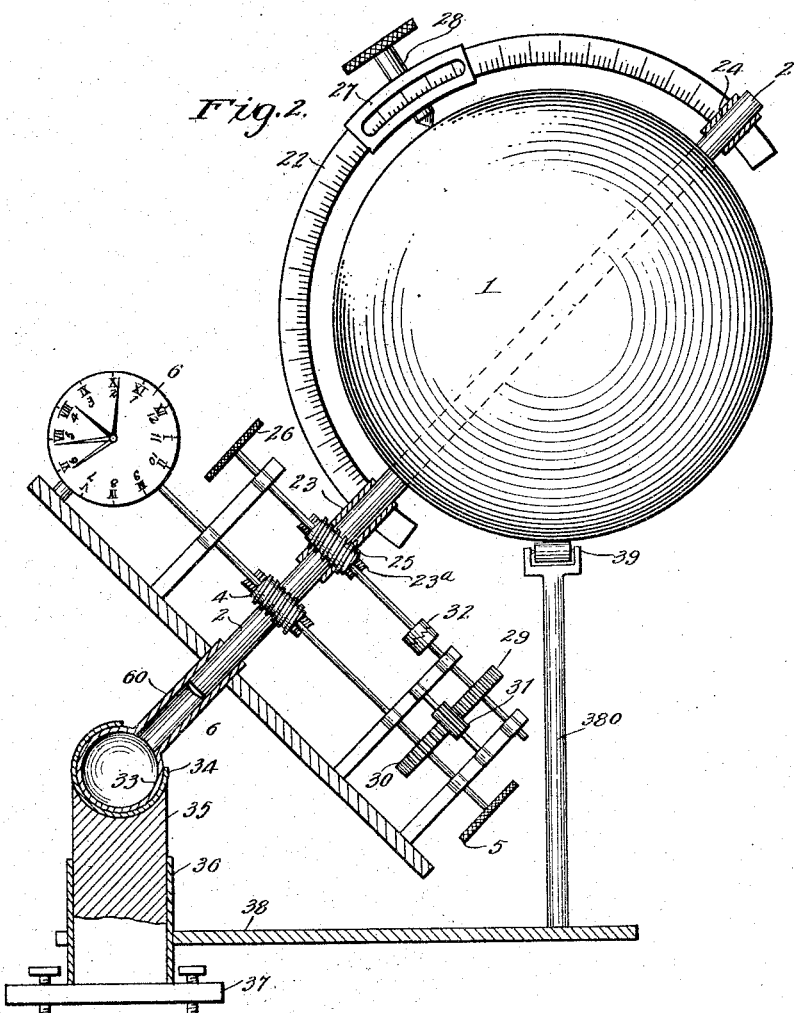

UNITED STATES PATENT OFFICE.

JULES MACÉ, OF MARSEILLE, FRANCE.

APPARATUS FOR SOLVING PROBLEMS OF SPHERICAL GEOMETRY.

1,223,502. Specification of Letters Patent. Patented Apr. 24, 1917.

Application filed May 7, 1913. Serial No. 766,210.

*To all whom it may concern:*

Be it known that I, JULES MACÉ, citizen of the Republic of France, residing at 1 Place St. Michel, Marseille, France, have invented certain new and useful Improvements in Apparatus for Solving Problems of Spherical Geometry, of which the following is a specification, reference being had therein to the accompanying drawings.

The invention pertains to a mechanical apparatus for solving a large number of problems relating to spherical geometry and astronomy and particularly those of navigation, by concretely representing the given data of the problems as well as the various steps until the final solution of the same.

The invention hereafter to be described is illustrated in the accompanying drawings which show two modes of execution of the apparatus one of which is more particularly adapted for solving problems of navigation and the other for solving astronomical problems on land.

Figure 1 is a perspective view of the form of execution of the apparatus specially intended for solving problems of navigation.

Fig. 2 is a front elevation and partly a section of the form of apparatus intended for solving problems on land.

Fig. 3 shows modifications of the spindle shown in Fig. 2.

Figs. 3ª 3ᵇ and 3ᶜ show details associated therewith.

Fig. 4 is a section on a larger scale showing the arrangement of the hands of the dial of Figs. 1 and 2.

In Fig. 1 a sphere 1 is shown supported on a rod 2 that rotates upon a bearing on its support 3 together with the sphere. Beneath the support the rod 2 is provided with a toothed wheel 2ª that has 24 teeth and engages with a worm 4 in such a manner that a complete revolution of the worm 4 advances the toothed wheel to the extent of one tooth. The axis of the worm is provided with a milled head 5 in order to be able to actuate the minute mechanism of a clockwork. For this purpose the beveled gearing at the right hand end of the shaft *a* actuates the vertical shaft there shown, and this operates in any well known manner to turn the horizontal shaft carrying the minute hand, which corresponds to the shaft 45 in Fig. 4. The description of Fig. 4 makes the action of the minute and hour hands clear. The graduations on the dial 6 show the movements of the hands.

The sphere 1 has a blank surface of a nature of a school blackboard and is of metal. No indications whatever are traced on its surface. The sphere is provided on the parts of its surface, that are to be used, with a coating of varnish made with turpentine for instance or with a coating of lampblack on which the recording stylus or the spindles described below are made to trace the diagram for solution of the problem. The lines traced can be rubbed out as on a blackboard or may be allowed to remain if desired.

A standard 7 perpendicularly placed on the support 3 is provided with an axis 8, the prolongation of which passes through the center of the sphere 1. On the axis 8 an arm 9 is arranged that has at a right angle an arm 10. This arm 9 may be provided with a weight 11, so as to balance the arm 10 and the parts attached to the same. The axis 8 forms the center of a dial 12 that is fixed on the axis 8 and is graduated in hours and minutes like a clock face. An indicator 13 fixed on the standard 7 shows the extent of rotation of arm 9 around its axis in a plane that is perpendicular to this axis.

Arm 10 is provided with a hole in which a sleeve 14 is fitted, and a spindle 15 passes through this sleeve. The center of this spindle passes through the prolonged axis of the sphere 1. Sleeve 14 controls by means of pinions 16 an indicator 17 that is moved in front of a dial 18 fixed on the arm 10. The sleeve 14 carries at its lower end a quadrant 19, that is graduated in minutes. This quadrant is arranged in such a manner that its graduated surface is in a diametrical plane of the sphere, and its surface remains in this position when the quadrant 19 is made to rotate around the axis of the spindle 15. The quadrant 19 is provided with a bridge-slide 20 with vernier and this slide has an indicator or stylus 21. The stylus 21 is in the prolongation of a radius of the sphere. The points of the indicators 15 and 21 are arranged to lie in the plane of the graduated surface.

The object and mode of operation of the parts described are as follows:

The milled head 5 provided on the worm 4 connected with the minute mechanism of the clockwork serves for the purpose of rotating the sphere around its axis and the graduation of the minute mechanism indicates the extent to which the sphere has turned. Since the sphere represents the earth, or the heavens as the case may be, one revolution of the sphere corresponds to twenty-four hours. Accordingly the indicator 6 is arranged to indicate one hour for every fifteen degrees of revolution of the sphere. The mechanism for this purpose is of a nature well understood in the arts and is moreover disclosed in Fig. 4 hereinafter fully described. Rotation of the framework 9 and 10 around the axis 8 causes the point of the spindle to describe a great circle parallel to the plane of rotation of the arm 9, while said spindle remains always in a radial position with respect to the sphere.

The spindle 15 traces lines in a diametrical plane when arm 9 is turned, and produces circles of latitude when the sphere is turned, arm 10 being fixed in any suitable position. The stylus or indicator 21 traces a circle that is concentric with the point of spindle 15. The size of this circle will depend on the position of the slide 20. The graduation of the dial 18 shows the azimuths. This follows from the pointer 17 being rotated by means of the beveled gear 16, meshing with the similar gear on the spindle 15.

In short the parts described serve for the purpose of turning the sphere around its supporting axis rod 2, of tracing circles on the sphere, and of reading the angles as well as the time.

Fig. 2 shows a modified form of execution of the apparatus. The reference numbers 1, 2, 3, 4, 5, 6 denote the same parts as Fig. 1. The rod 2 passes through the ball and is prolonged on each side. This rod is provided with an arc 22 that is concentric with the ball and is fixed on tubes 23 and 24 that are arranged with friction contact on rod 2. Tube 23 has a toothed wheel 23—A with 24 teeth, that engages with a worm 25 rotated by the screw head 26. The arc 22 is provided with a slide 27 and an indicator 28. The shaft of the worm 25 is prolonged and has a toothed wheel 29 and the shaft of worm 4 also has a toothed wheel 30. These two wheels have the same number of teeth and are connected by a pinion 31. 32 is a clutch for disengaging the gear wheel 29.

The rod 2 is fitted into a tubular socket 60, extending at right angles from the tube 33, and is adapted to turn within said socket. The tube 33 turns within the correspondingly shaped tubular support 34 which partly embraces it, as shown, and this support is carried by a stem 35 which projects vertically therefrom and turns within the sleeve 36 carried on the base plate 37. The weight of the sphere is carried on a roller 39 at the extremity of a rod 380 carried by the horizontal support 38.

A variety of sighting devices may be applied for the purpose of suitably directing the axis of the spindle 28 toward a star, for instance, in locating the same on the sphere. Some of these are shown in Figs. 3ª, 3ᵇ and 3ᶜ. In Fig. 3ª is shown a light rod 40 mounted parallel to the spindle 28 which latter is suitably prolonged for the purpose. The mounting shown in Fig. 3ª makes it possible to draw the rod 40 into a position where it will be convenient to sight along the rod, while maintaining parallelism with the spindle 28.

In Fig. 3ᶜ the spindle is shown hollow and has a mirror 41 set at an angle of 45 degrees opposite an opening in the side for sighting purposes. When the star to be observed is in the axis of the hollow spindle it will become visible by reflection to one looking at the mirror from the side, as shown by the faint lines in the figure.

In the arrangement shown in Figs. 3 and 3ᵇ the top of the spindle has a cross piece 42 whose ends are upturned. A slender shaft 43 is mounted between these upturned ends and supports a mirror 430 whose opposite end bears constantly and slidably upon the prolonged extremity 44 of the axis 2 of the sphere (see Fig. 3ᵇ). In this arrangement the extremity of the prolongation 44 should be at the same distance from the center of the sphere as is the shaft 43. This mirror can then be used for sighting, since the construction described insures the mirror always making an angle of forty-five degrees with the spindle.

Fig. 4 shows the arrangement of the hands of dial 6 (Figs. 1 and 2). The shaft 45 carries the minute hand 46. On this shaft a rod 47 is mounted with friction contact that carries a hand 48. A sleeve 49, loose on the shaft 45, carries the hour hand 50 and is driven from said shaft by the train of gears 490, 491, 492 and 493, all in a manner familiar in ordinary clocks. A second sleeve 51 is mounted frictionally upon the sleeve 49 and carries the pointer 52.

It will thus be seen that the hand for the minutes 48 and the hand for the hours 52 can be turned around by hand without shifting the hands 46 and 50.

The apparatus thus described may be employed in a variety of ways for solving geometric and astronomical problems and recording observations. Some of these are described, for instance, in my British Patent No. 12091 of 1913 wherein the apparatus herein described is set forth. Other specific uses of the device will readily occur to those skilled in the art.

It is of course understood that gears with different numbers of teeth may be substituted for those described and other changes may be made which will be obvious to those skilled in the art without departing from the spirit of this invention.

Having so described my invention and in what manner it is performed, I declare that what I claim is:

1. Apparatus for solving problems in spherical geometry comprising a revoluble shaft, a sphere thereon, time indicating mechanism geared to said shaft so as to revolve therewith, a marking device adapted to be brought into contact with said sphere, a revoluble mounting therefor having its axis of revolution radially placed with respect to said sphere, an indicator connected with said mounting, a graduated sector, a second marking device movably mounted on said sector, and mounting means for said sector adapted to permit its revolution about the axis of said first-named marking device, substantially as described.

2. Apparatus for solving problems in spherical geometry comprising a revoluble shaft, a sphere thereon, time indicating mechanism geared to said shaft so as to revolve therewith, auxiliary time indicating means movable by hand and associated with said first named time indicating mechanism, a marking device adapted to be brought into contact with said sphere, a revoluble mounting therefor having its axis of revolution radially placed with respect to said sphere, an indicator connected with said mounting, a graduated sector, a second marking device movably mounted on said sector, and mounting means for said sector adapted to permit its revolution about the axis of said first-named marking device, substantially as described.

3. Apparatus for solving problems in spherical geometry comprising a revoluble shaft, a sphere thereon, time indicating mechanism geared to said shaft so as to revolve therewith, an upright parallel to said shaft, a revoluble shaft on said upright placed radially with respect to said sphere, an arm on said shaft at right angles thereto having a right angled extension, a marking point mounted upon said extension, a graduated sector placed in a diametrical plane, a mounting therefor adapted to permit revolution thereof around the axis of said marking point, and a second marking point, movably mounted upon said sector, substantially as described.

4. Apparatus for solving problems in spherical geometry comprising a shaft so mounted as to be revoluble on its own axis and inclinable at various angles at will, a sphere on said shaft, adjustable means for supporting said sphere and shaft, a graduated sector carried by and revoluble upon said shaft, a marking device movable on said sector and an indicating device suitably geared to said shaft for measuring the angles of revolution thereof, substantially as described.

5. Apparatus for solving problems in spherical geometry comprising a shaft so mounted as to be revoluble on its own axis and inclinable at various angles at will, a sphere on said shaft, a graduated sector carried by and revoluble upon said shaft, a marking device movable on said sector and an indicating device suitably geared to said shaft for measuring the angles of revolution thereof, substantially as described.

6. Apparatus for solving problems in spherical geometry comprising a revoluble shaft, a sphere thereon, an indicating device adapted to measure the angles of revolution of said shaft and motion transmitting means connecting said shaft and indicating device, said means including a movable clutch, substantially as described.

In witness whereof I have hereunto set my hand in the presence of two witnesses.

JULES MACÉ.

Witnesses:
EMILE G. MATHIS,
LUCIEN MEMMINGER.

Copies of this patent may be obtained for five cents each, by addressing the "Commissioner of Patents, Washington, D. C."